US009983426B2

(12) United States Patent
Zhou (10) Patent No.: US 9,983,426 B2
(45) Date of Patent: May 29, 2018

(54) DISPLAY MODULE AND DISPLAY DEVICE COMPRISING DISPLAY MODULE

(71) Applicants: BOE TECHNOLOGY GROUP CO., LTD., Beijing (CN); BEIJING BOE CHATANI ELECTRONICS CO., LTD., Beijing (CN)

(72) Inventor: Peng Zhou, Beijing (CN)

(73) Assignees: BOE TECHNOLOGY GROUP CO., LTD., Beijing (CN); BEIJING BOE CHATANI ELECTRONICS CO., LTD., Beijing (CN)

( * ) Notice: Subject to any disclaimer, the term of this patent is extended or adjusted under 35 U.S.C. 154(b) by 0 days. days.

(21) Appl. No.: 15/122,274

(22) PCT Filed: Jan. 15, 2016

(86) PCT No.: PCT/CN2016/071001
§ 371 (c)(1),
(2) Date: Aug. 29, 2016

(87) PCT Pub. No.: WO2017/024770
PCT Pub. Date: Feb. 16, 2017

(65) Prior Publication Data
US 2017/0176805 A1    Jun. 22, 2017

(30) Foreign Application Priority Data
Aug. 11, 2015   (CN) ..................... 2015 2 0601930 U (51) Int. Cl.
*G02F 1/1333* (2006.01)
(52) U.S. Cl.
CPC .. *G02F 1/133308* (2013.01); *G02F 1/133305* (2013.01); *G02F 2001/133314* (2013.01); *G02F 2001/133317* (2013.01)

(58) Field of Classification Search
CPC ......... G02F 1/133308; G02F 1/133305; G02F 1/133608; G02F 1/133311;
(Continued)

(56) References Cited

U.S. PATENT DOCUMENTS 9,568,757 B2 *   2/2017  Lee ................... G02F 1/133308
2011/0075066 A1 *  3/2011  Itakura .............. G02F 1/133604
                                                        349/62
(Continued)

FOREIGN PATENT DOCUMENTS

CN          102053401 A      5/2011
CN          102236181 A     11/2011
(Continued)

OTHER PUBLICATIONS

International Search Report and Written Opinion dated May 10, 2016; PCT/CN2016/071001.

*Primary Examiner* — Joseph L Williams
*Assistant Examiner* — Jose M Diaz
(74) *Attorney, Agent, or Firm* — Ladas & Parry LLP; Loren K. Thompson (57) ABSTRACT

A display module and a display device including the display module are disclosed, the display module includes a backboard, a rubber frame and a display panel, the backboard includes a bottom plate and side walls provided at the perimeter of the bottom plate; the display panel is provided on a upper surface of the rubber frame, the rubber frame is configured for supporting the display panel in the vertical direction, and a side face, in the vertical direction, of the display panel is configured immediately adjacent to at least one side wall, or a spacing is configured between a side face, in the vertical direction, of the display panel and at least one side wall, in this way, the side walls are configured as retaining walls for the display panel in the horizontal direc-
(Continued)

tion; therefore, the bezel thickness is decreased and the effect of narrow bezel can be realized.

19 Claims, 3 Drawing Sheets

(58) Field of Classification Search
CPC ........ G02F 2001/133314; G02F 2001/133317;
G02F 1/133314; G02F 1/133317
See application file for complete search history.

(56) References Cited

U.S. PATENT DOCUMENTS

| | | | |
|---|---|---|---|
| 2011/0102701 A1 | 5/2011 | Teng et al. | |
| 2011/0228191 A1* | 9/2011 | Hsu | G02F 1/13338 349/58 |
| 2011/0261282 A1 | 10/2011 | Jean et al. | |
| 2013/0107156 A1 | 5/2013 | Zhou | |
| 2013/0141665 A1* | 6/2013 | Huang | G02F 1/133308 349/60 |
| 2014/0002768 A1* | 1/2014 | Kuo | G02F 1/133512 349/60 |
| 2014/0120275 A1 | 5/2014 | Lu et al. | |
| 2014/0139983 A1* | 5/2014 | Suzuki | G06F 1/1601 361/679.01 |
| 2015/0248036 A1* | 9/2015 | Bu | G02F 1/133308 349/58 |
| 2015/0346540 A1* | 12/2015 | Bu | G02F 1/133308 349/60 |
| 2016/0187557 A1* | 6/2016 | Zhang | G02B 6/009 362/606 |
| 2016/0238877 A1* | 8/2016 | Wagner | G02F 1/133308 |
| 2016/0291386 A1* | 10/2016 | Wang | G02B 6/00 |
| 2017/0038632 A1* | 2/2017 | Hsu | G02F 1/133308 |

FOREIGN PATENT DOCUMENTS

| | | |
|---|---|---|
| CN | 102384442 A | 3/2012 |
| CN | 102654660 A | 9/2012 |
| CN | 204462587 A | 7/2015 |
| JP | 2000-147486 A | 5/2000 |

* cited by examiner

DISPLAY MODULE AND DISPLAY DEVICE COMPRISING DISPLAY MODULE

TECHNICAL FIELD

At least one embodiment of the present disclosure relates to a display module and a display device comprising the display module.

BACKGROUND

In the display technology field, the structure of a display module in a display device is an important factor impacting the bezel thickness of the display device. With the continuous development of display device market, customers have increasing demands on the bezel thickness to allow larger screen-to-body ratio and better visual effect. In a display device, a backboard and a rubber frame are key components of a display device, and mainly used in fixing and bearing a display panel, so that the display panel can normally display an image.

SUMMARY

At least one embodiment of the present disclosure provides a display module and a display device comprising the display module, the display module can greatly reduce the bezel thickness of the display module while a good fixation effect can be maintained in the horizontal direction and narrow bezel effect is achieved.

At least one embodiment of the present disclosure provides a display module, which comprises a backboard, a rubber frame and a display panel, the backboard comprises a bottom plate and a plurality of side walls provided at a perimeter of the bottom plate, so as to form a mounting groove; the rubber frame is provided in the mounting groove, and the rubber frame is provided along the perimeter of the bottom plate; the display panel is configured on an upper surface of the rubber frame, the rubber frame is configured for supporting the display panel in a vertical direction, and a side face, in the vertical direction, of the display panel is configured immediately adjacent to at least one side wall, or a spacing is configured between the side face, in the vertical direction, of the display panel and at least one side wall, in this way, the side walls are configured as retaining walls in a horizontal direction for the display panel.

For example, in the display module provided by an embodiment of the present disclosure, in the case of the spacing being configured between the side face, in the vertical direction, of the display panel and the at least one side wall, a buffer layer is provided between the side face, in the vertical direction, of the display panel and the at least one side wall.

For example, in the display module provided by an embodiment of the present disclosure, the material of the buffer layer comprises a buffer tape or foam.

For example, in the display module provided by an embodiment of the present disclosure, at least one side wall of the plurality of side walls comprises a bending edge so as to form a lamination structure.

For example, in the display module provided by an embodiment of the present disclosure, the bending edge is bent outwards.

For example, in the display module provided by an embodiment of the present disclosure, the upper surface of the rubber frame is lower than a lower surface of the display panel.

For example, in the display module provided by an embodiment of the present disclosure, the display panel is bond onto the upper surface of the rubber frame through a first adhesive layer.

For example, in the display module provided by an embodiment of the present disclosure, the upper surface of the rubber frame is a flat surface or a substantially flat surface.

For example, in the display module provided by an embodiment of the present disclosure, the bottom plate and the plurality of side walls are integratedly formed.

For example, in the display module provided by an embodiment of the present disclosure, a second adhesive layer is provided between the rubber frame and the backboard.

For example, the display module provided by an embodiment of the present disclosure further comprises a backlight module provided below the display panel, and the backlight module is disposed in the mounting groove.

For example, in the display module provided by an embodiment of the present disclosure, the backlight module comprises a light source, a light guide plate, a reflector and an optical film.

At least one embodiment of the present disclosure provides a display device comprises any one of above-mentioned display modules.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DRAWING REFERENCE NUMBERS

10—backboard; 101—bottom plate; 102—side wall; 11—mounting groove; 12—rubber frame; 121—first extension portion of rubber frame; 122—second extension portion of rubber frame; 123—upper surface of rubber frame; 13—display panel; 131—side face in vertical direction of display panel; 133—lower surface of display panel; 14—reflector; 15—light guide plate; 16—optical film; 17—first adhesive layer; 18—second adhesive layer; 19—bending edge; 20—buffer layer; 21—light source; 22—spacing; 23—backlight module.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
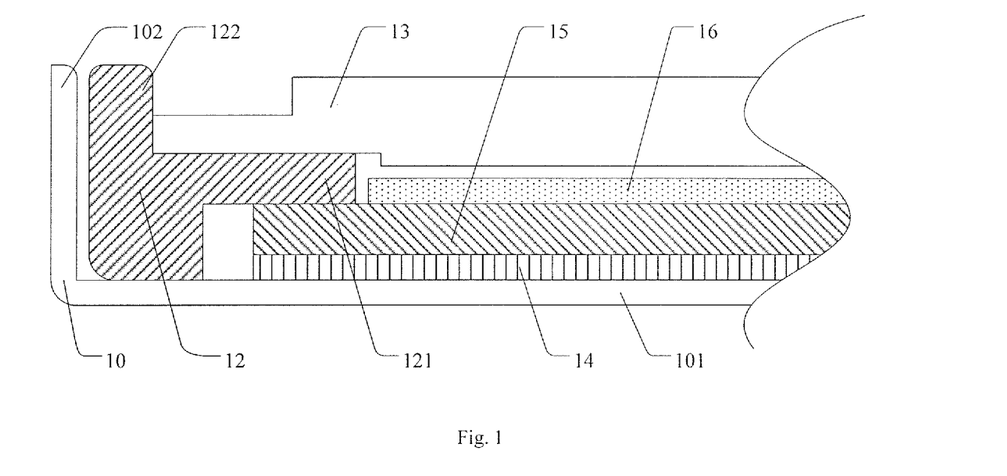
FIG. 1 is a structural schematic diagram of a display module.

As illustrated in FIG. 1, a liquid crystal display module generally comprises a backboard 10 configured at the bottom; a rubber frame 12, which is provided on the backboard 10 and along the perimeter of the backboard 10; a liquid crystal display panel 13, which is provided on the rubber frame 12; and a backlight module, which is configured on the backboard 10 and below the liquid crystal display panel 13. For example, the backlight module comprises a light source, a reflector 14, a light guide plate 15 and an optical film 16. The rubber frame 12 comprises a rubber frame bearing portion 121 extending in the horizontal direction and a rubber frame retaining wall 122 extending in the vertical direction. The rubber frame bearing portion 121 is configured for bearing the display panel 13 in the vertical direction, the rubber frame retaining wall 122 is configured as a retaining wall in the horizontal direction for the display panel 13. It is apparent from FIG. 1 that the bezel thickness is equal to the sum of the thickness of a side wall 102, the thickness of the rubber frame retaining wall 122, and the spacing between the side wall 102 and the rubber frame retaining wall 122. Obviously, the bezel thickness of such a display module cannot meet the demands of narrow bezel in the market.

At least one embodiment of the present disclosure provides a display module, which comprises a backboard, a rubber frame and a display panel, the backboard comprises a bottom plate and a plurality of side walls provided at the perimeter of the bottom plate, so as to form a mounting groove. The rubber frame is held in the mounting groove, and the rubber frame is provided along the perimeter of the bottom plate.

The display panel is disposed on a upper surface of the rubber frame, the rubber frame is configured for supporting the display panel in the vertical direction, and a side face, in the vertical direction, of the display panel is disposed immediately adjacent to at least one side wall, or a spacing is configured between a side face, in the vertical direction, of the display panel and at least one side wall, in this way, the side walls are configured as retaining walls in the horizontal direction for the display panel.

At least one embodiment of the present disclosure provides a display module and a display device, the bezel thickness of the display device that comprises the display panel is decreased through eliminating a rubber frame retaining wall for fixing the display panel in the horizontal direction; the display panel is fixed in the horizontal direction through substituting the rubber frame retaining wall with side walls, therefore, the immobility of the display panel is maintained.

In the following, the description is conducted with reference to several embodiments.

First Embodiment

Figure 2:
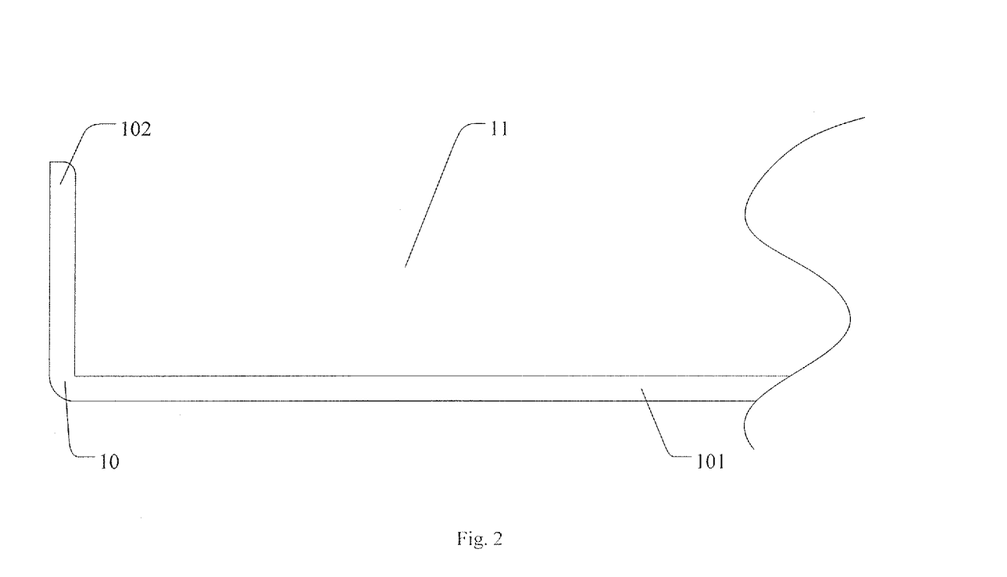
FIG. 2 is a structural schematic diagram of a mounting groove of a display module provided by an embodiment of the present disclosure.

The present embodiment provides a display module. As illustrated in FIG. 2, the display module comprises a backboard 10, which comprises a bottom plate 101 and a plurality of side walls 102 (FIG. 2 only shows one side wall) provided at the perimeter of the bottom plate 101, so as to form a mounting groove. For example, the bottom plate 101 and the plurality of side walls 102 can be integratedly formed.

Figure 3A:
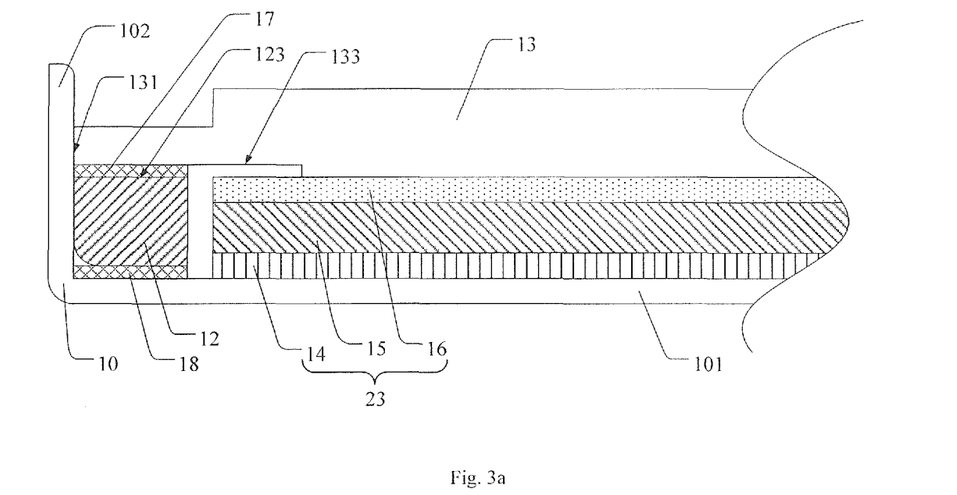
FIG. 3a is a structural schematic diagram of a display module provided by an embodiment of the present disclosure.

As illustrated in FIG. 3a, the display module further comprises a rubber frame 12, which is provided in the mounting groove 11 and along the perimeter of the bottom plate 101, and a display panel 13, which is provided on an upper surface 123 of the rubber frame 12. Based on the structure, the rubber frame 12 can support the display panel 13 in the vertical direction. A side face 131, in the vertical direction, of the display panel 13 is configured immediately adjacent to at least one side wall 102, the side walls 102 are configured as retaining walls in the horizontal direction for the display panel 13. That is, the side walls 102 function as the retaining walls in the horizontal direction for the display panel 13. Therefore, the display module in a narrow bezel design is achieved.

For example, in one example of the present embodiment, as illustrated in FIG. 3a, the upper surface 123 of the rubber frame 12 is lower than a lower surface 133 of the display panel 13.

As illustrated in FIG. 3a, the upper surface of the rubber frame 12 is not provided with the extension portion, i.e., the rubber frame retaining wall is not provided thereon. For example, the upper surface of the rubber frame 12 is completely overlapped with the display panel 13, but this embodiment is not limited to this case. For example, the upper surface of the rubber frame 12 is a flat surface, but this embodiment is not limited to this case.

For example, in one example of the present embodiment, as illustrated in FIG. 3a, a first adhesive layer 17 can be further provided between the display panel 13 and the rubber frame 12. Based on the structure, the display panel 13 is bonded onto the upper surface of the rubber frame 12 through the first adhesive layer 17, and in this way a better effect of fixing the display panel 13 can be achieved.

For example, in one example of the present embodiment, as illustrated in FIG. 3a, a second adhesive layer 18 can be further provided between the rubber frame 12 and the bottom plate 101. Based on the structure, the rubber frame 12 can be bonded onto the bottom plate 101 through the second adhesive layer 18, and therefore an effect of fixing the rubber frame 12 can be achieved.

It should be understood that the rubber frame 12 can be bonded onto the side walls 102 through an adhesive layer provided between the rubber frame 12 and the side walls 102, or the rubber frame 12 can be bonded onto both the bottom plate 101 and the side walls 102 through the second adhesive layer 18 provided between the rubber frame 12 and the bottom plate 101 and the adhesive layer provided between the rubber frame 12 and the side wall 102, so as to realize the effect of fixing the rubber frame 12.

For example, the display module provided in one example of the present embodiment further comprises a backlight module 23 provided below the display panel 13. The backlight module 23 is configured in the mounting groove 11.

For example, in one example of the present embodiment, as illustrated in FIG. 3a, the backlight module 23 can adopt a side-lit backlight. For example, the backlight module 23 can comprises a reflector 14, a light guide plate 15 and an optical film 16 disposed sequentially in the mounting groove 11.

Figure 3B:
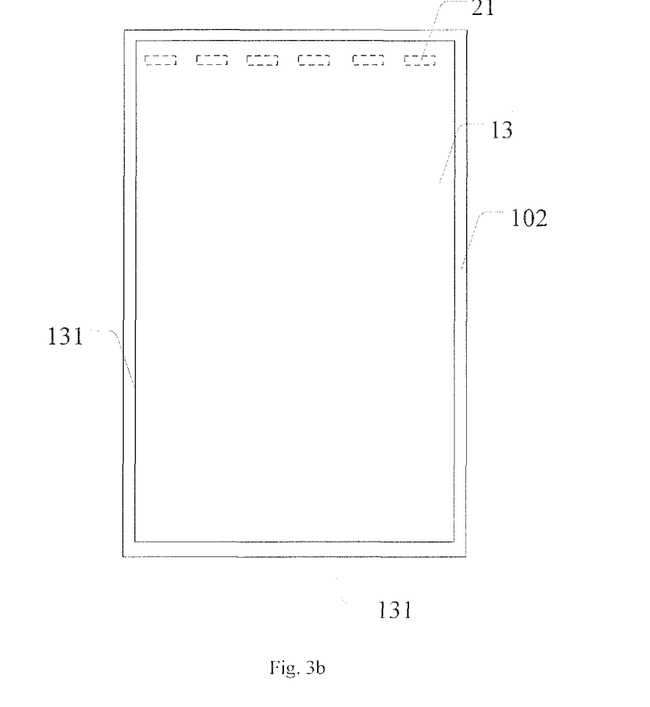
FIG. 3b is a schematically structural plan view of a display module provided by an embodiment of the present disclosure.

For example, in one example of the present embodiment, as illustrated in FIG. 3b, the backlight module 23 comprises a light source 21; the light source 21 can be disposed at a side of the light guide plate 15. For example, as illustrated in FIG. 3b, the display module comprises four bezels, which are an up bezel, a down bezel, a left bezel and a right bezel, respectively. For example, except for the bezel located at the side with the light source, any bezel or bezels of the other three bezels can adopt the narrow bezel design in the present embodiment.

For example, the light source 21, the reflector 14, the light guide plate 15 and the optical film 16 can provide backlight for the display module. For example, the light source 21 can be a point light source such as a light emitting diode (LED), or a line light source such as a cold cathode fluorescent lamp (CCFL).

Obviously, the backlight module in the present embodiment can adopt a direct-lit backlight, in this case, any bezel or bezels of the up bezel, the down bezel, the left bezel and the right bezel can adopt the narrow bezel design in the present embodiment. The present embodiment is described with reference to the side-in backlight.

In the display module provided by the present embodiment, the display panel 13 is arranged on the rubber frame 12, the rubber frame 12 bears the display panel 13 in the vertical direction, however, the rubber frame retaining wall in the horizontal direction is eliminated, and the part as the retaining wall is substituted with the side walls 102. As illustrated in FIG. 3a, the bezel thickness of the display module provided by the present embodiment is equal to the thickness of the side walls 102; the bezel thickness is decreased compared with conventional technology mentioned above, and therefore, the bezel thickness of the display module is decreased and the effect of narrow bezel is realized while the immobility of the display panel is maintained.

Second Embodiment

The present embodiment provides a display module. The display module comprises a backboard 10, which comprises a bottom plate 101 and a plurality of side walls 102 provided at the perimeter of the bottom plate 101, so as to form a mounting groove 11 (refer to FIG. 2). For example, the bottom plate 101 and the plurality of side walls 102 can be integratedly formed.

Figure 4:
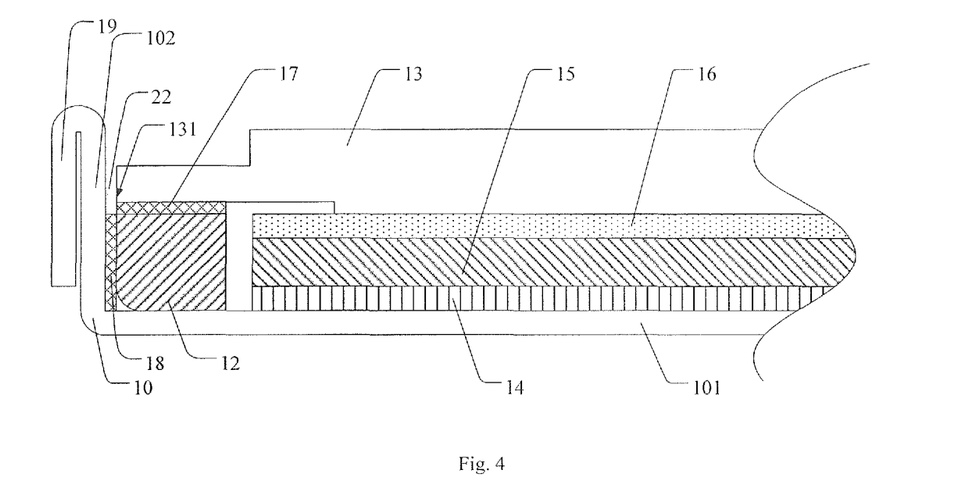
FIG. 4 is a structural schematic diagram of a display module provided by another embodiment of the present disclosure.

As illustrated in FIG. 4, the display module further comprises a rubber frame 12, which is provided in the mounting groove 11 and along the perimeter of the bottom plate 101, and a display panel 13, which is provided on an upper surface 123 of the rubber frame 12. Based on the structure, the rubber frame 12 can support the display panel 13 in the vertical direction. A spacing 22 is configured between a side face, in the vertical direction, of the display panel 13 and the side walls 102, and the provision of the spacing can effectively relieve the shock to the display panel 13 from the side walls 102, which function as the retaining walls in the horizontal direction for the display panel 13, during unexpected fall or collision of the display panel.

For example, in one example of the present embodiment, in order to further increase the buffer effect and retaining wall effect of the single-layered side wall, as illustrated in FIG. 4, the side walls 102 each comprise a bending edge so as to form a lamination structure. The side wall with the lamination structure can function as the buffer and the retaining wall more effectively. For example, the bending edge 19 is bent outwards. The bending edge 19 can also be bent inwards.

It should be understood that the bending edge 19 can increase the strength in the horizontal direction of the side walls 102 to allow a better fixation effect. In addition, the material of the side walls 102 has better strength characteristics than the material of the rubber frame 12; in the case of realizing the same strength, the side wall 102 can be thinner than the rubber frame retaining wall in the conventional technology mentioned above; therefore, even with the bending edge 19, the display module provided in one example of the present embodiment has a narrower bezel than the display module in the conventional technology mentioned above.

For example, in one example of the present embodiment, as illustrated in FIG. 4, the upper surface of the rubber frame 12 is provided without the extension portion, i.e. the rubber frame retaining wall is not provided. For example, the upper surface of the rubber frame 12 can be a flat surface.

For example, in one example of the present embodiment, as illustrated in FIG. 4, a first adhesive layer 17 can be further provided between the display panel 13 and the rubber frame 12, the display panel 13 is bonded onto the upper surface of the rubber frame 12 through the first adhesive layer 17, and therefore a better effect of fixing the display panel 13 can be achieved.

For example, in one example of the present embodiment, as illustrated in FIG. 4, a second adhesive layer 18 can be further provided between the rubber frame 12 and the side wall 102, the rubber frame 12 can be bonded onto the side wall 102 through the second adhesive layer 18, and therefore an effect of fixing the rubber frame 12 can be achieved.

It should be understood that the rubber frame 12 can be bonded onto the bottom plate 101 through an adhesive layer provided between the rubber frame 12 and the bottom plate 101, or the rubber frame 12 can be bonded onto both the bottom plate 101 and the side wall 102 through the adhesive layer provided between the rubber frame 12 and the bottom plate 101 and the second adhesive layer 18 provided between the rubber frame 12 and the side wall 102, so as to realize the effect of fixing the rubber frame 12.

For example, the display module provided in one example of the present embodiment further comprises a backlight module 23 provided below the display panel 13; the backlight module 23 can comprises a reflector 14, a light guide plate 15 and an optical film 16 that are disposed in the mounting groove 11, and comprises a light source 21 provided at a side of the light guide plate 15. The light source 21, the reflector 14, the light guide plate 15 and the optical film 16 can provide backlight for the display module. The light source 21 can be a point light source such as an LED, or a line light source such as a CCFL.

The display module provided by the present embodiment have at least one of the following beneficial effects:

(1) In the case of the side walls have the bending edges, the display panel 13 is arranged on the rubber frame 12, the rubber frame 12 bears the display panel 13 in the vertical direction, however, the rubber frame retaining wall in the horizontal direction is eliminated, the side walls 102, each of which comprises the bending edge 19 and forms a lamination structure, function as the retaining walls in the horizontal direction. The bezel thickness of the display module provided by the present embodiment is equal to the thickness of the two-layered side walls 102; the bezel thickness is decreased compared with the conventional technology mentioned above, therefore, the bezel thickness of the display module is decreased and the effect of narrow bezel is realized while the immobility of the display panel is maintained. In addition, each of the side walls 102 has the bending edge 19, the strength of the side wall, which functions as the retaining wall, is increased; therefore, better fixation and protection effects can be realized.

(2) In the case of a spacing 22 being configured between a side face in the vertical direction of the display panel 13 and the side wall 102, the provision of the spacing can effectively relieve the shock to the display panel 13 from the side wall 102, which is function as the retaining wall in the horizontal direction for the display panel 13, during unexpected fall or collision of the display panel.

(3) The bearing portion extending in the horizontal direction is eliminated, and the rubber frame 12 is fixed through a second adhesive layer 18 provided between the rubber frame 12 and the side walls 102 instead of an adhesive layer provided between the bottom plate 101 and the rubber frame 12; therefore, the thickness in the vertical direction of the rubber frame 12 is decreased as well, and the effect of light weight and thin profile is realized to a certain extent.

Third Embodiment

The present embodiment provides a display module. The display module comprises a backboard 10, which comprises a bottom plate 101 and a plurality of side walls 102 provided at the perimeter of the bottom plate 101, so as to form a mounting groove 11. For example, the bottom plate 101 and the plurality of side walls 102 can be integratedly formed.

Figure 5:
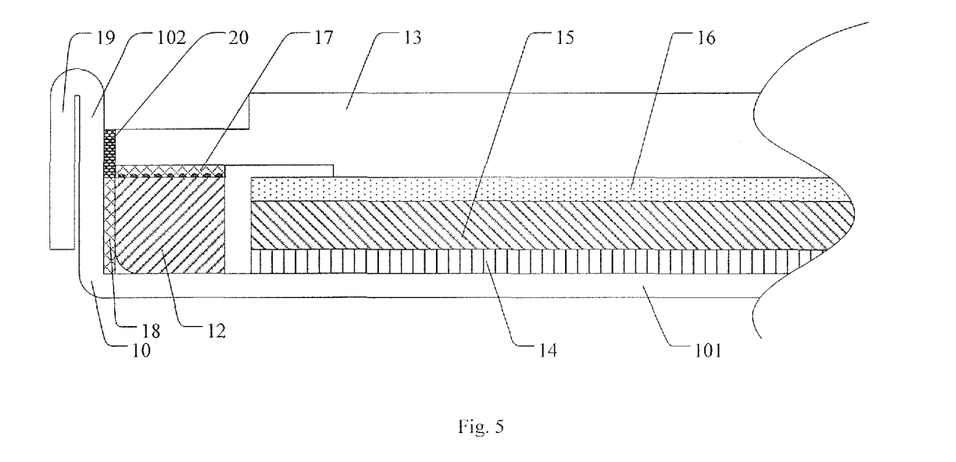
FIG. 5 is a structural schematic diagram of a display module provided by another embodiment of the present disclosure.

As illustrated in FIG. 5, the display module further comprises the rubber frame 12, which is provided in the mounting groove 11 and along the perimeter of the bottom plate 101, and the display panel 13, which is provided on an upper surface of the rubber frame 12. The rubber frame 12 is configured for supporting the display panel 13 in the vertical direction. A spacing is configured between a side face, in the vertical direction, of the display panel 13 and the side wall 102, and a buffer layer 20 is provided in the spacing, the side walls 102 function as the retaining walls in the horizontal direction for the display panel 13. Because of the provision of the buffer layer, the buffer layer can buffer the external force applied on the side wall, the shock to the display panel 13 can further relieved during the unexpected fall or collision of the display panel 13.

For example, in one example of the present embodiment, the material of the buffer layer can comprise a buffer tape or foam, but the embodiment is not limited thereto.

For example, in one example of the present embodiment, as illustrated in FIG. 5, the side wall 102 comprises a bending edge so as to form a lamination structure. For example, the bending edge can bend outwards.

It should be understood that the bending edge 19 can increase the strength in the horizontal direction of the side wall 102 to allow better retaining wall effect. In addition, the material of the side wall 102 has better strength characteristics than the material of the rubber frame 12; in the case of realizing the same strength, the side walls 102 can be thinner than the rubber frame retaining wall in the conventional technology mentioned above; therefore, even with the bending edge 19, the display module provided in one example of the present embodiment has a narrower bezel than the display module in the conventional technology mentioned above.

For example, as illustrated in FIG. 5, the upper surface of the rubber frame 12 is provided without the extension portion, i.e. the rubber frame retaining wall is not provided.

For example, in one example of the present embodiment, as illustrated in FIG. 5, a first adhesive layer 17 can be further provided between the display panel 13 and the rubber frame 12, the display panel 13 is bonded onto the upper surface of the rubber frame 12 through the first adhesive layer 17, and a better effect of fixing the display panel 13 can be achieved. For example, a plurality of convex portions can be configured on the upper surface of the rubber frame 12, so as to increase the adhesion between the rubber frame 12 and the adhesive layer 17.

For example, in one example of the present embodiment, as illustrated in FIG. 5, a second adhesive layer 18 can be further provided between the rubber frame 12 and the side walls 102, the rubber frame 12 can be bonded onto the side walls 102 through the second adhesive layer 18, and an effect of fixing the rubber frame 12 can be achieved.

It should be understood that the rubber frame 12 can be bonded onto the bottom plate 101 through an adhesive layer provided between the rubber frame 12 and the bottom plate 101, or the rubber frame 12 can be bonded onto both the bottom plate 101 and the side walls 102 through the adhesive layer provided between the rubber frame 12 and the bottom plate 101 and the second adhesive layer 18 provided between the rubber frame 12 and the side walls 102, so as to realize the effect of fixing the rubber frame 12.

For example, the display module provided in one example of the present embodiment further comprises a backlight module 23 provided below the display panel 13. The backlight module 23 can comprises a reflector 14, a light guide plate 15 and an optical film 16 that are disposed in the mounting groove 11, and comprises a light source 21 configured at a side of the light guide plate 15. The light source 21, the reflector 14, the light guide plate 15 and the optical film 16 can provide backlight for the display module.

The display module provided by the present embodiment have at least one of the following beneficial effects:

(1) With the buffer layer 20 provided between a side face, in the vertical direction, of the display panel 13 and the side wall 102, the display module can provide better protection for the display panel 13, in the case of external force, for example caused by collision, being applied, the buffer layer 20 can protect the display panel 13 from breaking into pieces.

(2) The bezel thickness of the display module provided by one example of the present embodiment is equal to the thickness of the two-layered side walls 102; the bezel thickness is decreased compare with the conventional technology described above, therefore, the bezel thickness of the display module is decreased and the effect of narrow bezel is realized while the immobility of the display panel is maintained.

Fourth Embodiment

The present embodiment provides a display device, and the display device comprises any one of above-mentioned display modules.

It should be understood that the present embodiment have not provide all the structures of the display device for the sake of clarity. In order to realize the essential function of the display device, those skilled in the art can include the structures, which are not shown in the present embodiment, according to the application, the present disclosure will be not limited thereto. The display device provided by the embodiment of the present disclosure has the same technical effect as the above-mentioned display module; no further description will be given herein.

For example, the display device can be a display apparatus such as a liquid crystal display screen and an electronic paper, and any product or device that has display function such as a television, a digital camera, a mobile phone, a watch, a tablet computer, a laptop, a navigator, including any of above-mentioned display apparatus.

The following content should be understood.

(1) "Immediately adjacent to" in the embodiment of the present disclosure means no other component is between objects. Other components herein include spacing, and the spacing is gap. It should be understood that the "immediately adjacent to" should be realized on the condition that mounting is ensured, i.e., the assembling gap is allowed within the tolerance limits. i.e., the assembling gap is existed because of the limitation of the process; the configured spacing is a reserved gap. For example, the spacing should larger than the assembling gap within the range of the tolerance limits.

(2) The embodiment of the present disclosure and the technical features in the present embodiment can be combined with each other if no conflict exists.

(3) In the above-mentioned embodiments, the rubber frame has a flat surface or a substantially flat surface to bear the display panel. Or, when the display panel is supported by the rubber frame, the upper surface of the rubber frame is lower than the lower surface of the display panel, in this way, it is not necessary for the rubber frame to provide a portion which can function as a retaining wall. The rubber frame can be formed with a variety of suitable materials, such as plastic, rubber and so on.

What are described above is related to the illustrative embodiments of the disclosure only and not limitative to the scope of the disclosure; with the technical content disclosed by the present disclosure, those skilled in the art can easily envisage modifications or substitutions, which should covered by the scope of the present invention. Therefore, the scopes of the disclosure are defined by the accompanying claims.

The application claims priority to the Chinese patent application No. 201520601930.2, filed on Aug. 11, 2015, the entire disclosure of which is incorporated herein by reference as part of the present application.

What is claimed is:

1. A display module, comprising a backboard, a rubber frame and a display panel, wherein,
the backboard comprises a bottom plate and a plurality of side walls provided at a perimeter of the bottom plate, so as to form a mounting groove;
the rubber frame is provided in the mounting groove, and the rubber frame is provided along the perimeter of the bottom plate;
the display panel is disposed on an upper surface of the rubber frame, and the rubber frame is configured for supporting the display panel in a vertical direction; and
a side face, in the vertical direction, of the display panel is configured immediately adjacent to at least one side wall, in this way, the side walls are configured as retaining walls in a horizontal direction for the display panel.

2. A display module, comprising a backboard, a rubber frame and a display panel, wherein
the backboard comprises a bottom plate and a plurality of side walls provided at a perimeter of the bottom plate, so as to form a mounting groove;
the rubber frame is provided in the mounting groove, and the rubber frame is provided along the perimeter of the bottom plate;
the display panel is disposed on an upper surface of the rubber frame, and the rubber frame is configured for supporting the display panel in a vertical direction;
a spacing is configured between the side face, in the vertical direction, of the display panel and the at least one side wall, in this way, the side walls are configured as retaining walls in a horizontal direction for the display panel; and
a buffer layer is provided between the side face, in the vertical direction, of the display panel and the at least one side wall;
a material of the buffer layer comprises a buffer tape or foam.

3. The display module according to claim 1, wherein, at least one side wall of the plurality of side walls comprises a bending edge so as to form a lamination structure.

4. The display module according to claim 3, wherein, the bending edge is bent outwards.

5. The display module according to claim 1, wherein, the upper surface of the rubber frame is lower than a lower surface of the display panel.

6. The display module according to claim 1, wherein, the display panel is bond onto the upper surface of the rubber frame through a first adhesive layer.

7. The display module according to claim 1, wherein, the upper surface of the rubber frame is a flat surface or a substantially flat surface.

8. The display module according to claim 1, wherein, the bottom plate and the plurality of side walls are integratedly formed.

9. The display module according to claim 1, wherein, a second adhesive layer is provided between the rubber frame and the backboard.

10. The display module according to claim 1, further comprising a backlight module provided below the display panel, the backlight module being provided in the mounting groove.

11. The display module according to claim 10, wherein, the backlight module comprises a light source, a light guide plate, a reflector and an optical film.

12. A display device, comprising the display module according to claim 1.

13. A display module, comprising a backboard, a rubber frame and a display panel, wherein
the backboard comprises a bottom plate and a plurality of side walls provided at a perimeter of the bottom plate, so as to form a mounting groove;

the rubber frame is provided in the mounting groove, and the rubber frame is provided along the perimeter of the bottom plate;

the display panel is disposed on an upper surface of the rubber frame, and the rubber frame is configured for supporting the display panel in a vertical direction;

a spacing is configured between the side face, in the vertical direction, of the display panel and the at least one side wall, in this way, the side walls are configured as retaining walls in a horizontal direction for the display panel; and at least one side wall of the plurality of side walls comprises a bending edge so as to form a lamination structure.

14. The display module according to claim 13, wherein, the bending edge is bent outwards.

15. The display module according to claim 13, wherein, the upper surface of the rubber frame is lower than a lower surface of the display panel.

16. The display module according to claim 13, wherein, the display panel is bond onto the upper surface of the rubber frame through a first adhesive layer.

17. The display module according to claim 13, wherein, a second adhesive layer is provided between the rubber frame and the backboard.

18. The display module according to claim 13, further comprising a backlight module provided below the display panel, the backlight module being provided in the mounting groove.

19. The display module according to claim 18, wherein, the backlight module comprises a light source, a light guide plate, a reflector and an optical film.

* * * * *